United States Patent
Coatantiec (10) Patent No.: US 9,146,322 B2
(45) Date of Patent: Sep. 29, 2015

(54) HYBRID SYSTEM AND DEVICE FOR CALCULATING A POSITION AND FOR MONITORING ITS INTEGRITY

(75) Inventor: Jacques Coatantiec, Fauconnieres (FR)

(73) Assignee: THALES, Neuilly sur Seine (FR)

( * ) Notice: Subject to any disclaimer, the term of this patent is extended or adjusted under 35 U.S.C. 154(b) by 589 days.

(21) Appl. No.: 12/878,605

(22) Filed: Sep. 9, 2010

(65) Prior Publication Data
US 2011/0084874 A1 Apr. 14, 2011

(30) Foreign Application Priority Data
Oct. 9, 2009 (FR) ................................ 09 04328

(51) Int. Cl.
G01S 19/47 (2010.01)
G01S 19/33 (2010.01)
G01C 21/16 (2006.01)
G01S 19/20 (2010.01)

(52) U.S. Cl.
CPC .............. *G01S 19/47* (2013.01); *G01C 21/165* (2013.01); *G01S 19/20* (2013.01); *G01S 19/33* (2013.01)

(58) Field of Classification Search
CPC ......... G01S 19/47; G01S 19/48; G01S 19/24; G01S 19/25; G01S 19/33; G01C 21/165
USPC ............... 342/357.3, 357.63–357.65, 357.31, 342/357.72–357.73; 701/472, 480
See application file for complete search history.

(56) References Cited

U.S. PATENT DOCUMENTS

| 5,702,070 A | 12/1997 | Waid |
| 6,570,531 B1 | 5/2003 | Stratton et al. |
| 7,328,104 B2* | 2/2008 | Overstreet et al. ............ 701/472 |
| 2008/0114544 A1* | 5/2008 | Liu et al. ....................... 701/213 |
| 2010/0026567 A1* | 2/2010 | Coatantiec et al. ...... 342/357.04 |
| 2012/0004846 A1* | 1/2012 | Coatantiec et al. ........... 701/470 |

FOREIGN PATENT DOCUMENTS

WO 2008/040658 4/2008

OTHER PUBLICATIONS

Search Report, issued on Jun. 25, 2010, for FR 0904328, filed on Sep. 10, 2009.

* cited by examiner

*Primary Examiner* — Cassie Galt
(74) *Attorney, Agent, or Firm* — Stroock & Stroock & Lavan LLP (57) ABSTRACT

Hybrid system (1) comprising an elementary hybrid system (2) comprising an extended processing module CALC (100) determining a first protection radius of the hybrid system RHG1, associated with a position quantity G, using a first extended variance/covariance matrix MHYPE1 as a function of a predetermined first false alarm probability PFA1, of a predetermined non-integrity level PNI and of a predetermined first probability PP1 of occurrence of an undetected hardware failure of a satellite positioning receiver.

19 Claims, 4 Drawing Sheets

HYBRID SYSTEM AND DEVICE FOR CALCULATING A POSITION AND FOR MONITORING ITS INTEGRITY

FIELD OF INVENTION

The invention relates generally to position measurement, and more particularly to the determination of a position measurement and to the monitoring of the integrity of this measurement.

BACKGROUND

For aircraft approach operations in mountainous regions, flight paths where strict adherence to a narrow corridor is imposed when the conditions of visibility are poor or military navigation at very low altitudes (sometimes referred to as flight in the terrain), the performance characteristics of the system of navigation must meet a level of demand compatible with the needs of the non-precision approaches commonly denoted by the acronym RNP (for "Required Navigation Precision"). The level of demand varies depending on the phase of the flight or the mission set. The level of demand consists in meeting criteria for precision, integrity, continuity and availability. The demand on integrity corresponds to the capacity of the system of navigation to raise an alarm within a given time delay when the system is affected by a failure or by a fault leading to a risk of error on the measurement of positioning, greater than a certain threshold.

In order to quantify the integrity of a position measurement, a parameter called protection radius is used. The protection radius corresponds to a maximum position error for a given level of confidence (or of risk). In other words, the probability of the position error exceeding the stated protection radius without an alarm being sent to a navigation system is less than this given probability value. The given probability value is commonly called the non-integrity level or level of risk. It is expressed as risk per hour that the position error will exceed the calculated protection radius without an alarm being raised. For operations of the RNP type in the approach phase, the non-integrity level generally required goes from $10^{-7}$ to $10^{-9}$ occurrences of a position error, greater than the protection radius, per hour depending on the type of failure envisaged.

A satellite positioning receiver commonly called GNSS (for "Global Navigation Satellite System") supplies information on position and speed of the carrier by triangulation using the signals emitted by orbiting satellites visible from the carrier. For civilian or non-classified military applications, the GNSS receiver also supplies the raw pseudo-range and Doppler measurements corresponding to each satellite tracked. In some civilian applications, the satellite positioning receiver is included in a more global multi-channel radiofrequency receiver system called MMR (for "Multi-Mode receiver") notably comprising an ILS receiver dedicated to the landing phases. "Satellite positioning receiver" is therefore understood to mean all the parts of the multi-channel radiofrequency receiver (multi-mode receiver or MMR) involved in the reception of the raw measurements.

The geographical positioning information supplied by the GNSS receiver may be momentarily unavailable because the receiver must have a minimum of four satellites of the positioning system in direct view in order to be able to generate a measurement. Furthermore, the satellite data may contain errors due to failures affecting the satellites. These unreliable data values must then be identified so as not to invalidate the position coming from the GNSS receiver or from an INS/GNSS hybrid position (described hereinbelow) which would use these raw measurements. In order to detect satellite failures and ensure the integrity of the GNSS measurements, a known solution is to equip a satellite positioning receiver with a precision and availability estimation system known as a RAIM (for "Receiver Autonomous Integrity Monitoring") which is based on the geometry and the redundancy of the constellation of satellites in order to exclude the faulty satellite.

More recently, hybrid systems have been developed which mathematically combine the inertial measurements supplied by an inertial measurement unit IMU and the measurements supplied by the satellite positioning receiver GNSS. These hybrid systems are known in the prior art by the term INS/GNSS ("Inertial Navigation System" and "Global Navigation Satellite System"). An inertial navigation system is defined which is a device including an inertial measurement unit IMU and associated processing means (notably enabling pure inertial navigation and inertia/GPS hybridization calculations to be performed). An inertial navigation system is also called an IRU (for "Inertial Reference Unit"). An inertial navigation system also including a processor or a partition of a processor designed to calculate flight parameters with respect to the air (air speed, incidence angle, wind sheer, altitude, etc.) and connected to probes situated on the skin of the aircraft which measure the total pressure, the static pressure, the temperature, etc. is called reference inertial and aerodynamic navigation system and ADIRU (for "Air Data Inertial Reference Unit").

The calculations for pure inertia navigation, based on the use of the measurements from the IMU (gyrometers and accelerometers) provide accurate position information in the short term, but which drift over the long term (under the influence of the defects in the sensors). In contrast, the measurements supplied by a GNSS receiver are less accurate in the short term, but do not drift over time. Thus, the precision of the errors supplied by the GNSS receiver allow the inertial drift to be controlled and the low-noise inertial measurements allow the noise on the measurements of the GNSS receiver to be filtered. The combination of the two types of measurement is carried out by a Kalman filter.

Kalman filtering is based, on the one hand, on the possibilities for modelling the time variation of the state of a physical system considered in its environment, by means of an equation referred to as trend equation (pre-estimation), and for modelling of the dependence relationship existing between the states of the physical system in question. On the other hand, the measurements by which the physical system is perceived from the outside are modelled, by means of an equation referred to as observation equation, in order to allow the re-adjustment of the states of the filter (post-estimation), in other words to enable the Kalman filter to be re-adjusted. In a Kalman filter, the effective measurement or "measurement vector" allows an estimate to be made of the state of the system retroactively which is optimal in the sense that it minimizes the covariance of the error made on this estimation. The estimator part of the filter generates pre-estimates of the vector of state of the system by using the observed difference between the effective measurement vector and its theoretical prediction to generate a corrective term, called 'innovation'.

One exemplary method for determination of positions and for monitoring their integrity is described in the Patent application WO2008040658 filed by the applicant. In this method, the hybridization is carried out using a Kalman filter. The Kalman filter receives the position and speed points supplied by the inertial measurement unit and the positioning measurements (pseudo-range and delta-range) supplied by the satellite positioning unit (known as 'tight hybridization' or 'on satellite axes'), models the time variation of the errors of the inertial navigation system and delivers the estimate of these errors retroactively. This method is known as a 'closed-loop method' since the estimate of the errors is used retroactively to readjust the positioning and speed point of the inertial navigation system. The method could also be carried out in open-loop mode, but the post-estimate of the inertial errors would then be sub-optimal with respect to the closed-loop process, since the estimation of a part of these variables would no longer perfectly correspond to the assumption of linearity.

In the document WO2008040658, a method for monitoring the integrity of the position measurement continually calculates a protection radius associated with the measurement of the position of the object in flight. As described in the document WO2008040658, the evaluation of the value of the protection radius generally results from calculations of probabilities using the static precision characteristics of the GNSS measurements and of the behaviour of the inertial sensors. The calculation is based on two types of error which are, on the one hand, the normal measurement errors and, on the other, the errors caused by an operational anomaly of the constellation of satellites. Furthermore, they take into account the eventuality of an undetected satellite failure.

However, the devices for positioning and for monitoring the integrity of the position measurement, that are based on hybridization methods or on systems for estimating precision and availability known as RAIM, do not guarantee the position measurements in the case of hardware failures in the on-board positioning receivers in the aircraft that remain undetected (by the equipment itself), namely the GNSS receivers or the inertial navigation systems. In other words, the value of the protection radius does not take into account the eventuality, and even less the presence, of a hardware failure affecting one of the positioning receivers. A hardware failure not detected by the built-in tests internal to the receivers and to the inertial navigation systems is then capable of generating an error, on the calculated position, greater than the aforementioned protection radius (which only takes into account satellite failures) without an alarm being raised. Unfortunately, the frequency of occurrence of an undetected hardware failure in the on-board equipment is often greater than the level of integrity required for the non precision approach phases. It is therefore necessary to protect the calculated position from their effect.

SUMMARY

The aim of the invention is to provide a hybrid system capable of position measurements and of monitoring their integrity that overcomes the aforementioned drawbacks.

For this purpose, a subject of the invention is a hybrid system comprising an elementary hybrid system comprising a primary module for delivering primary elementary raw measurements $MB_{j1}$ each comprising positioning measurements and measurements of noise affecting the said positioning measurements, an elementary module for delivering inertial measurements MI comprising increments of angles and of speed, a hybridization unit receiving the inertial measurements MI and when they are available, the primary raw measurements $MB_{j1}$, and producing a first elementary hybrid solution PPVI1 comprising position measurements and error parameters for the elementary module together with a primary variance/covariance matrix MHYP1, the said hybrid system also comprising:

a secondary module for delivering secondary elementary raw measurements $MB_{j2}$,
  a first extended Kalman filter KE1 receiving the first elementary hybrid solution PPVI1, the primary variance/covariance matrix MHYP1 and, when they are available, the primary $MB_{j1}$ and secondary $MB_{j2}$ elementary raw measurements coming from satellites common to the primary module and secondary module, the said extended filter KE1 having a first extended vector of state VEE1 comprising a part known as hybrid difference ΔX, representing the difference between the first elementary hybrid solution PPVI1 and a second elementary hybrid solution PPVI2 associated with the inertial measurements MI and, when they are available, with the secondary elementary raw measurements $MB_{j2}$, the said first extended vector of state VEE1 also comprising an error part of the elementary hybrid system X1 affecting the first elementary hybrid solution PPVI1, the said extended Kalman filter delivering a first extended variance/covariance matrix MHYPE1 for the error of a first estimation EVEE1 of the first vector of state VEE1,
  an extended processing module CALC receiving the first extended variance/covariance matrix MHYPE1, the said extended processing module CALC determining a first protection radius for the hybrid system RHG1, associated with a position quantity G, using the first extended variance/covariance matrix MHYPE1 as a function of a first predetermined false alarm probability PFA1, of a predetermined non-integrity level PNI and of a first predetermined probability PP1 of occurrence of an undetected hardware failure of a satellite positioning receiver.

Advantageously, the first protection radius of the hybrid system RHG1 associated with a position quantity G is calculated based on a first detection threshold SEΔG1 associated with the hybrid difference ΔX relating to the quantity G, the said first threshold being obtained based on a part of the first extended variance/covariance matrix MHYPE1 associated with the hybrid difference ΔX relating to the said position quantity G, for the first predetermined false alarm probability PFA1, the said first protection radius of the hybrid system RHG1 also depending on a part of the first extended variance/covariance matrix MHYPE associated with the error part of the elementary hybrid system X1 relating to the position quantity G for a first level of risk PND1 chosen so as to be less than or equal to the ratio between the non-integrity level PNI and the probability PP1 of occurrence of an undetected hardware failure of a satellite positioning receiver.

Advantageously, the primary module, respectively the secondary module, is a unit for modelling primary raw measurements, respectively secondary raw measurements, delivered by a primary, respectively secondary, satellite positioning receiver, operating using constellations of tracked visible satellites; the elementary module for delivering inertial measurements MI is a unit for modelling inertial measurements delivered by an inertial navigation system.

Advantageously, the primary module, respectively the secondary module, is a primary satellite positioning receiver GNSS1, respectively secondary GNSS2, operating using constellations of tracked visible satellites; the elementary module for delivering inertial measurements MI is an inertial navigation system CI.

Advantageously, the first extended Kalman filter KE1 also receives a hybrid correction HYC and produces a first estimation EVEE1 of the first extended vector of state VEE1, the said extended processing module CALC performing a first test for detection of a hardware failure, affecting one of the satellite positioning receivers taken from either the primary receiver or the secondary receiver, by comparing the components of the first estimation EVEE1, relating to the hybrid difference ΔX obtained for a position quantity G, with the said first detection threshold SEΔG1 associated with the hybrid difference ΔX relating to the quantity G, when at least one of the components of the first estimation EVEE1, of the first extended vector of state VEE1 relating to the difference ΔX obtained for a position quantity G, is greater than the first detection threshold SEΔG1, the extended processing module CALC triggers an alarm on the presence of a failure of at least one satellite positioning receiver.

Advantageously, when none of the components of the first estimation EVEE1 of the first extended vector of state VEE1 relating to the difference ΔX obtained for the position quantity G is greater than the first detection threshold SEΔG1, the non-integrity level PNI is equal to a normal non-integrity level PNIN. Advantageously, when an alarm is triggered, the supply for the hybridization unit and for the extended Kalman filter KE1 by means of the primary and secondary raw measurements is stopped and the said non-integrity level PNI is equal to a coasting non-integrity level PNIS greater than or equal to the normal non-integrity level PNIN.

Advantageously, the hybrid system also comprises:
a tertiary satellite positioning receiver GNSS3 producing tertiary raw measurements $MB_{m3}$,
a second KE2 extended Kalman filter receiving the same data as the first extended filter KE1 with the exception of the secondary raw measurements $MB_{j2}$ which are replaced by the tertiary raw measurements $MB_{m3}$, and producing a second estimation EVEE2 of a second extended vector of state VEE2, and an associated second extended variance/covariance matrix MHYPE2,
a third KE3 extended filter receiving the same data as the first extended filter KE1 with the exception of the primary raw measurements $MB_{i1}$ which are replaced by the tertiary measurements $MB_{m3}$ and producing a third estimation EVEE3 of a third extended vector of state VEE3, and an associated third extended variance/covariance matrix MHYPE3, the said extended processor CALC also calculating a second and a third protection radius for the hybrid system RHG2, RHG3 relating to a position quantity G, using the second MHYPE2 and respectively the third MHYPE3 extended variance/covariance matrices and also performing a second and a third test consisting in comparing the components of the second EVEE2 and the third EVEE3 estimation, relating to the difference obtained for the quantity G, with respectively the second SEΔG2 and the third SEΔG3 thresholds, the results TE1, TE2, TE3 of the first, second and third tests being positive when the said components of the first EVEE1, respectively the second EVEE2, respectively the third EVEE3 estimations are respectively greater than the first SEΔG1, second SEΔG2 and third SEΔG3 thresholds, and when at least one of the results TE1, TE2, TE3, respectively from the first, second and third tests is positive, an alarm is raised, the said extended processor CALC also identifying the defective receiver, from amongst the three receivers, based on the results TE1, TE2, TE3 and, where necessary, excluding the defective receiver.

Advantageously, the inertial navigation system is a reference inertial and aerodynamic navigation system. Advantageously, the satellite positioning receiver(s) is (or are) included in (one or more) radiofrequency multi-mode receiver(s) MMR.

Another subject of the invention is a device comprising a number M greater than 1 of hybrid systems $Si_k$, each supplying an elementary protection radius $REG_k$ associated with a position quantity G, a hybrid protection radius $RHG_k$ associated with the said position quantity G together with a variance/covariance matrix of the elementary solution $MHYP1_k$ associated with the error made on a first elementary hybrid solution $PPVI1_k$, the said device also comprising a consolidation module CONS determining a global hybrid solution SGLOB, the said consolidation module CONS determining an inertial protection radius RIMUG, which is the lowest value taken from amongst the individual inertial protection radii $RIMUG_k$ calculated for each inertial navigation system $CI_k$, the first elementary hybrid solution $PPVI1_k$ is of which is different from the global solution SGLOB, each individual inertial protection radius $RIMUG_k$ depending on:
the statistics $SG_k$ for the difference between the global solution and the first elementary solution $PPVI1_k$, for the quantity,
the first variance/covariance matrix for the elementary solution $MHYP1_k$,
a second acceptable false alarm frequency PFA2 and on a second level of risk PND2 chosen so as to be less than or equal to the ratio between the non-integrity level PNI and a determined probability PP2 of occurrence of a failure in an inertial navigation system.

Advantageously, the statistics $SG_k$ for the difference between the global solution and the first elementary solution $PPVI1_k$, for the quantity G, is equal to the sum of the errors in the variance-covariance matrices of each of the first elementary hybrid solutions. Advantageously, the consolidation module CONS also determines a global protection radius RGLOBG associated with one of the position quantities G composing the global hybrid solution SGLOB, the said protection radius RGLOBG being the highest value taken from amongst the elementary protection radii $REG_k$, the hybrid protection radii $RHG_k$, and the inertial protection radius RIMUG.

A hybrid system and a device according to the invention allowing their respective position measurements to be continuously protected from any possible hardware failures affecting a satellite positioning receiver and potentially an inertial measurement unit. They also allow a failure of a satellite positioning receiver to be detected.

The hybrid system and the device according to the invention are capable of predicting the performance of the aircraft in terms of protection radius on a predetermined flight path. The device according to the invention does not need any particular assumption to be made on the nature of the hardware failures affecting the equipment employed.

The hybrid system according to the invention is solely based on the statistics of the difference between a first elementary hybrid solution and a second elementary hybrid solution in order to monitor the integrity of the first elementary hybrid solution. For this monitoring, the architecture provided does not need the elementary hybridization unit to be duplicated in order to calculate the second hybrid solution.

BRIEF DESCRIPTION OF THE DRAWINGS

Other features and advantages of the invention will become apparent upon reading the detailed description that follows, presented by way of non-limiting example and with reference to the appended drawings, in which.

From one figure to another, the same elements are identified by the same references.

DETAILED DESCRIPTION OF CERTAIN EMBODIMENTS OF THE INVENTION

The invention relates to a hybrid system comprising a hybridization unit INS/GNSS delivering an elementary hybrid solution PPVI comprising elementary hybrid position measurements G (horizontal position, in other words latitude and longitude, altitude, speed, heading, etc.). The hybridization unit also delivers at least one protection radius which, for greater clarity, will be called hybrid protection radius, associated with an elementary hybrid position measurement, for a given non-integrity level PNI. This protection radius protects the hybrid position measurement against effects of the undetected satellite failures. The document WO2008040658 gives a description of an exemplary manner of calculating this hybrid protection radius.

Figure 1:
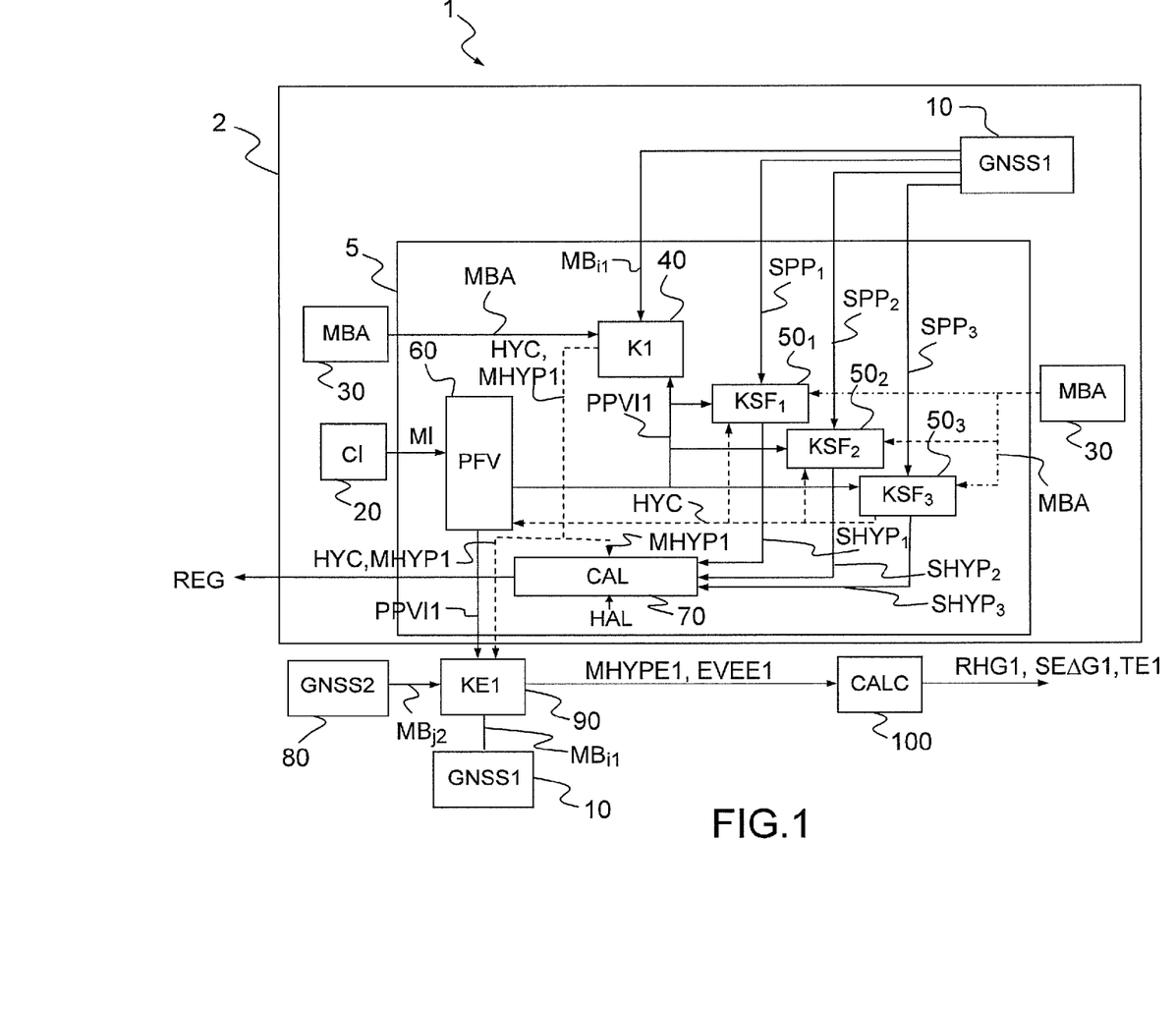
FIG. 1 shows schematically a first example of the hybrid system according to the invention.

In FIG. 1, a first example of the hybrid system 1 of a device according to the invention is shown such as it operates in flight.

The hybrid system 1 according to the invention comprises an elementary hybrid system 2 comprising,
- an elementary module 20 for delivering inertial measurements MI which is, in the example shown, an inertial navigation system CI, 20, comprising an inertial measurement unit IMU (not shown),
- a primary module 10 for delivering primary elementary raw measurements $MB_{i1}$ from the signals transmitted by satellites, i denoting a satellite index and being in the range between 1 and N, the module being, in the example shown in FIG. 1, a primary satellite positioning receiver GNSS1, 10, operating using a constellation of N tracked visible satellites;
- a hybridization unit 5 producing a first elementary hybrid solution PPVI1 comprising first positioning measurements (first position and speed measurements) and error parameters for the elementary module 20, obtained by hybridizing the inertial measurements MI and the primary elementary raw measurements, when they are available.

The inertial measurement unit IMU comprises sensors comprising gyrometers and accelerometers (not shown). The inertial measurements comprise increments of angles and of speed. The primary raw measurements coming from the GNSS receiver comprise positioning measurements including raw pseudo-ranges and delta-ranges together with the noise affecting the positioning measurements and the ephemerides of the tracked satellites.

In the example shown in FIG. 1, the hybridization unit 5 comprises:
- a virtual platform PFV, 60 receiving the inertial measurements MI and producing a first elementary hybrid solution PPVI1,
- a Kalman hybridization filter K1, 40.

The Kalman hybridization filter K1 receives first raw measurements $MB_{i1}$. The Kalman hybridization filter K1 also receives the first elementary hybrid solution PPVI1. The Kalman hybridization filter K1 tries to estimate the errors made on the inertial solution; it produces:
- a hybrid correction HYC comprising a vector of state VE corresponding to the errors on the elementary hybrid system, obtained by observing the difference between the elementary hybrid position measurements comprised in the first elementary hybrid solution PPVI1 and the primary raw measurements $MB_{i1}$;
- a primary variance/covariance matrix MHYP1 for the error made on the estimation of the vector of state VE.

The hybrid correction HYC is delivered, on the one hand, to the virtual platform (the inertial measurements and the raw measurements are said to be hybridized) and, on the other hand, to the secondary filters (which will be described below) such that the value of the components of the vectors of state VE and VEi (which will be described hereinafter) are close to zero. The elementary hybrid system according to the invention is said to be a closed-loop system. As a variant, the elementary hybrid system is an open-loop system.

In summary, the Kalman hybridization filter has a vector of state corresponding to the errors in the elementary hybrid system, in particular the residual bias and drift errors of the inertial navigation system. It observes the differences between the position measurements supplied by the inertial navigation system and by the GNSS receiver 1. It has a time-variation matrix F modelling the variation of the errors in the elementary hybrid system over time, an observation matrix H modelling the relationships between the vector of states and the differences observed between the position measurements delivered by the inertial navigation system and the measurements supplied by the GNSS receiver, and a gain K which is used to re-adjust the inertial navigation system. The gain K is calculated such that it minimizes retroactively the covariance of the error VE made on the hybrid solution. The gain K is calculated according to a known method starting from the variance/covariance matrix associated with the vector of state and with the precision of the measurements.

The hybridization unit also comprises a bank of N secondary Kalman filters $KSF_i$, $50_i$. The secondary Kalman filter $KSF_i$ receives the elementary raw measurements from N−1 signals. The N−1 signals are produced by the tracked satellites except for the satellite of index i. This set of raw measurements of N−1 signals is denoted $SPP_i$. The hybridization filter K1 and the secondary filters $KSF_i$ receive the inertial positioning and speed points of the first elementary hybrid solution PPVI1. The secondary filters $KSF_i$ produce hybrid parameters $SHYP_i$ which comprise:
- an estimation of a vector of state, $EVE_i$ corresponding to the errors in the hybrid system observing differences between the inertial positioning and speed points coming from the first elementary hybrid solution PPVI1 and the set of raw measurements $SPP_i$ and,
- a secondary variance/covariance matrix $P_i$ for the error made on the estimation of the vector of state $EVE_i$.

The hybridization unit comprises a processing module CAL, 70 receiving the hybrid parameters $SHYP_i$ and the primary variance/covariance matrix MHYP1 and determines a value of elementary protection radius REG associated with a position quantity G (for example the horizontal position). The determination of the protection radius protecting the hybrid position from the effect of any possible satellite failures, for a given non-integrity level PNI, is described in the document WO2008040658.

The elementary hybrid system shown in FIG. 1 comprises a barometric module 30 delivering barometric measurements MBA which are sent to the Kalman hybridization filter K1 and to the secondary hybridization filters. Indeed, in this embodiment the inertial navigation system is an ADIRU. As a variant, the inertial navigation system is an IRU.

The hybrid system according to the invention comprises:
  a first secondary module 80 for generation of L secondary elementary raw measurements $MB_{j2}$ transmitted by satellites, j being an index denoting a satellite and being in the range between 1 and L. In the embodiment shown in FIG. 1, the secondary module is a secondary satellite positioning receiver GNSS2, 80, operating using a constellation of L tracked visible satellites,
  a Kalman filter KE1, 90, which will be referred to as first extended Kalman filter, receiving the first elementary hybrid solution PPVI1, the primary variance/covariance matrix MHYP1 and the hybrid corrections HYC and, when they are available, the primary $MB_{i1}$ and secondary $MB_{j2}$ raw measurements coming from the satellites common to the primary and secondary receivers and the hybrid corrections HYC. In an open-loop architecture, the correction HYC is equal to zero.

The primary and secondary modules deliver primary MBi1, respectively secondary MBj2, elementary raw measurements from signals transmitted by satellites, where i denotes a satellite index in the range between 1 and N and where j denotes a satellite index in the range between 1 and L.

The extended filter KE1 has a first extended vector of state VEE1 comprising:
  the errors X1 in the elementary hybrid system representing the errors in the various components of the first elementary solution PPVI1 and being estimated by means of a conventional error model representing the errors of an inertial navigation system,
  the errors X2 common to the measurements of the GNSS receivers on board the aircraft, comprising components of the ionospheric errors, the tropospheric errors, and the ephemerides errors,
  the errors HI1 and HL2 affecting the clocks of the primary receiver GNSS1 and, respectively, of the secondary receiver GNSS2 (bias, drift, acceleration of the clocks, sensitivity to the acceleration),
  the difference ΔX representing the difference between the first elementary hybrid solution PPVI1 and a second elementary hybrid solution PPVI2 (comprising second positioning measurements and inertial navigation system error parameters) associated with the inertial measurements MI and with the secondary raw measurements coming from satellites common to the primary and secondary receivers, in other words obtained by hybridizing, by means of the first hybridization unit 5, the inertial measurements MI and the secondary raw measurements.

The measurements of the primary receiver and of the secondary receiver are affected by common errors and independent errors coming only from the receiver (receiver clock, thermal noise). On the current signals, the common errors are by far the predominant errors. If the clock error of the receiver, which is readily identifiable, is ignored and if, for calculating the hybrid solution, a set of satellites common to the primary receiver and to the secondary receiver is used at each re-adjustment of the primary Kalman filter, the difference between the first elementary hybrid solution PPVI1 and the second elementary hybrid solution PPVI2 is then only due to the part of the error caused by the receivers. As these errors are small (noise), the difference must remain small since otherwise it is representative of an error.

The extended filter KE1 delivers:
  a first estimation EVEE1 of the first extended vector of state VEE1, the first extended vector of state being estimated by the filter KE1 by using successively the primary $MB_{i1}$ and secondary $MB_{j2}$ measurements which come from the satellites common to the primary and secondary receivers,
  a first variance/covariance matrix MHYPE1, known as extended variance/covariance matrix, representing the error statistics relating to the estimation of the extended vector of state EVEE1.

The hybrid system also comprises a processing module CALC, 100, known as extended processing module, receiving the first extended variance/covariance matrix MHYPE1 and the estimation of the first extended vector of state VEE1.

The estimation of the difference ΔX is obtained by subtracting two identical models of time variation for two different vectors of state comprising X1 representing the errors in the elementary hybrid system and a second vector of state X1' representing the errors in a second elementary hybrid system hybridizing the inertial measurements and the secondary raw measurements $MB_{j2}$ coming from satellites common to the primary and secondary receivers. The ΔX part could have been replaced by a vector X1' identical to X1, but it is more insightful to reason based on X1-X1' whose time variation is the same as that of X1 to within the model noise since it is identical on X1 and X1'. When the difference is calculated, the noise disappears, which results in the time-variation equations presented hereinafter. In this way, the filter estimates directly the quantity of interest and the statistical law that it obeys.

The first extended observation matrix relating to the raw measurements coming from the first GNSS receiver 1 is expressed solely as a function of the X1 part.

The time-variation equations of the X1 part and of the ΔX part depend on the same time-variation matrix F. These equations are the following:

$$d(X1)/dt = F \cdot X1 + w,$$

$$d(\Delta X)/dt = F \cdot \Delta X$$

where w represents the model noise that takes into account the modelling approximations for the inertial errors and F the time-variation matrix of the secondary Kalman filter.

The states of the first extended vector of state of the Kalman filter KE1 (which represents errors) are by their nature unknown and are therefore initialized at 0. The extended variance/covariance matrix MHYPE is initialized based on the range of possible uncertainty for the various errors (in other words the various states of the filter). The extended filter KE1 applies the hybrid corrections HYC to its vector of state because the system that it is modelling takes into account the hybrid corrections HYC (they are in fact used to correct the elementary hybrid solutions.)

The primary raw measurements are used to re-adjust the error part of the elementary hybrid system X1, the common errors X2 and the clock errors HI1 affecting the primary receiver GNSS1. The secondary raw measurements are used to re-adjust the error part of the elementary hybrid system X1, the common errors X, the clock errors HI2 affecting the secondary receiver GNSS2 and the extended hybrid difference ΔX.

A first test for detecting hardware failures affecting one of the satellite positioning receivers taken from either the primary receiver GNSS1 or the secondary receiver GNSS2, undetected upstream of the hybridization filter, in other words, either by verification internal to the receiver in question or by the processor CAL 70 which conventionally carries out a test referred to as innovation test consisting in comparing, for each Kalman hybridization filter, the measurement of a quantity with the value of this quantity predicted by the said Kalman hybridization filter, will now be described.

The test for detecting undetected hardware failures is carried out by the extended processor 100. The hybrid system according to the invention is based on the fact that the probability of undetected hardware failures simultaneously affecting the satellite receivers of the hybrid system is negligible with respect to the non-integrity level PNI sought. The extended Kalman filter supplies, with the first extended variance/covariance matrix MHYPE1, and more particularly with the part of this matrix relating to the extended hybrid difference ΔX, a Gaussian representation of the statistical law which the difference between the two hybrid solutions obeys (obtained on the basis of the two receivers) one of which is exact since the fact that simultaneous hardware failures affect the two receivers may be neglected.

Advantageously, a first acceptable false alarm probability PFA1 is defined during a test for detecting hardware failures affecting a satellite positioning receiver of the hybrid system. PFA1 represents the maximum probability of an alarm being triggered whereas no GNSS receiver has a fault from false alarms (in other words from false detections of failures). For a given first probability of false alarms PFA1, the extended processor CALC, 100, is capable of defining first detection thresholds SEΔG1 each associated with the hybrid difference ΔX relating to a quantity G. Beyond the first detection threshold SEΔG1, the difference between a first hybrid measurement of the quantity G, included in the first elementary hybrid solution PPVI1, and a second hybrid measurement of the quantity G coming from the second elementary hybrid solution PPVI2, is judged out of statistics and representative of a failure of a satellite positioning receiver of the hybrid system. The first detection threshold SEΔG1 depends solely on the first acceptable false alarm frequency PFA1 and on the part of the extended variance/covariance matrix associated with the extended hybrid difference relating to this quantity. In order to detect a hardware failure associated with a GNSS receiver, the processor CALC, 100, compares the components ΔGn of the first estimation EVEE1 of the first extended vector of state VEE1 associated with the estimated difference for the quantity G, with the corresponding difference threshold. The components relating to the differences in latitude and in longitude are compared, for example, with the first threshold when the quantity G is the horizontal position. When at least one component ΔGn is greater than the first detection threshold SEΔG1 associated with the quantity G, an alarm is raised. The first result TE1 of the first test is said to be positive when at least one component of the first estimation EVEE1 exceeds the first threshold SEΔG1, otherwise the test is negative. In practice, the principle of the detection threshold is applicable to each component of the first extended vector of state VEE1 but, advantageously, it is the differences between the position measurements that are of interest. More specifically, a vertical threshold for the difference between the first and the second elementary hybrid altitude (coming, respectively, from the first and from the second elementary hybrid solution) may be calculated or else a horizontal threshold for the difference between the elementary hybrid latitude and longitude.

As explained previously, the threshold SEx defined for a given variable x takes into account the standard deviation $\sigma_x$ of the estimation of the variable x. The standard deviation may be deduced from the variance/covariance matrix associated with the variable. This is the square root of the variance/covariance of the variable, in other words the square root of the coefficient of the diagonal of the variance/covariance matrix corresponding to the variable measured.

The detection threshold SEx for a variable x is given by the following formula:

$$SEx = n1 * \sigma_x$$

n1 is a probability threshold that is dependent on the first false alarm frequency PFA1.

It is given by the following formula under the assumption that the false alarm frequency follows a Gaussian behaviour:

$$PFA1 = \frac{2}{\sqrt{2\pi}\,\sigma_x} * \int_T^\infty e^{\frac{-t^2}{2\sigma_x^2}} dt$$

where $T = n1 * \sigma_x$

In the hybrid system according to the invention, the variables which are of interest are hybrid differences associated with quantities G of the position differences. The standard deviation may be deduced from the first extended matrix MHYPE1. When the variable is associated with only one component of the extended vector of state VEE1, the standard deviation is equal to the square root of the coefficient of the diagonal of the extended variance/covariance matrix MHYPE1 corresponding to the variable x. This is for example the case when the difference between the elementary hybrid altitudes is sought. In contrast, when the difference between the hybrid horizontal positions is sought, the difference uses two components of the extended vector of state: the difference between the latitudes Δθx and the difference between the longitudes Δθy, with respective standard deviations $\sigma_{\Delta\theta_x}$ and $\sigma_{\Delta\theta_x}$. It is necessary to calculate a standard deviation $\sigma_{\Delta H}$ relating to the difference between the horizontal components of the elementary hybrid positions coming from two hybrid solutions. Several methods exist for calculating the threshold SEx associated with a variable x having a plurality of components j. A threshold is, for example, calculated making the assumption that the components of the variable in question are decorrelated. This is a conservative assumption which leads to the maximum value of the threshold. The standard deviation associated with the variable is equal to the quadratic sum of the standard deviations associated with the respective components j of the variable. For example, the standard deviation $\sigma_{\Delta H}$ associated with the difference between the horizontal components of the two elementary horizontal hybrid positions is given by the following formula:

$$\sigma_{\Delta H} = \sqrt{(\sigma^{\Delta\theta x 2} + \sigma_{\Delta\theta_y}^2)}$$

As a variant, the correlation between the components of the variable is taken into account. The acceptable threshold is, for example, calculated starting from the evaluation of an ellipse of confidence as is described in the Patent application WO2008040658. This method divulges how a protection radius R is calculated (here this is the first threshold SEΔG1) that is associated with the difference from a quantity G, having two components for example Δθx and Δθy, based on a given value of probability Pb (here this is the first false alarm frequency PFA1) and on the variance/covariance matrix P linking these two components (2*2 matrix extracted from the extended variance/covariance matrix and relating to the 2 horizontal position difference states, the said matrix P comprising diagonal coefficients σΔθx and σΔθx associated with the two components and a correlation coefficient which is the non-diagonal coefficient ρ.

In order to monitor the integrity of a position measurement G included in the individual hybrid solution, the extended processor CALC, 100, calculates a first protection radius for the hybrid system RHG1 associated with a measured quantity G protecting the position measurement of the first elementary hybrid solution against hardware failures potentially affecting the satellite positioning receivers of the hybrid system. The first protection radius for the hybrid system RHG1 is the potential maximum error affecting the estimation of the position quantity G by means of the elementary hybrid system, for a given non-integrity level taking into account the eventuality of a failure of one of the satellite positioning receivers of the hybrid system. The protection radius is calculated, using the first extended variance/covariance matrix MHYPE1, for a predefined non-integrity level PNI, for a first acceptable false alarm probability PFA1 and for a predefined first level of risk PND1. The non-integrity level PNI is the maximum probability, expressed in number of occurrences $10^{-x}$ per hour that the error affecting an elementary hybrid measurement of a given quantity exceeds the first protection radius of the hybrid system RHG1 without an alarm being sent (where x is an integer number).

More precisely, the protection radius for the hybrid system is given by the following formula: RHG1=SEΔG1+SEG1, where SEG1 represents the protection radius associated with the noise (or with the normal errors) affecting the part of the elementary hybrid error X1 relating to the quantity G. The protection radius SEG1 associated with the noise is calculated for a first level of risk PND1 chosen so as to be less than or equal to the ratio between the non-integrity level PNI and a probability of occurrence of a non-detected hardware failure PP1 of a satellite positioning receiver. Thus, the risk of the normal noise (in other words in the absence of a failure of a satellite positioning receiver) leading to an error in position greater than SEG1 is equal to PND1, which is less than or equal to the ratio between PNI and PP1. For example, for an integrity level PNI equal to $10^{-x}$/h, with x=7, and a frequency of non-detected hardware failures of a satellite positioning receiver PP1 equal to $10^{-4}$/h, a probability PND 1 less than $10^{-3}$/h is preferably chosen.

The protection radius associated with the noise SEG1, affecting the position measurement G coming from the first elementary hybrid solution, is calculated by means of one of the methods used for the first threshold SEΔG1 using the standard deviation $\sigma_{G1}$ of the error in elementary hybrid position relating to the quantity G. The standard deviation is obtained starting from the variance of the extended variance/covariance matrix part that is associated with the error in the elementary hybrid system obtained for the quantity G. For example, the threshold or protection radius linked to the noise is given by the following formula: SEG1=n2*$\sigma_{G1}$, where n2 represents the coefficient that allows the required non-integrity level PNI to be maintained taking into account the first frequency of undetected hardware failures PND1. n2 is given by the following formula:

$$PND1 = \frac{2}{\sqrt{2\pi}\,\sigma_{G1}} * \int_{T'}^{\infty} e^{\frac{-t^2}{2\sigma_{G1}^2}} dt$$

T' is equal to n2*$\sigma_{G1}$.

For the aforementioned example, where PND1 is less than $10^{-3}$ undetected hardware failures per hour, n2=3.3 may be chosen. Thus, the protection radius protecting the hybrid solution from any potential hardware failures in the satellite positioning receivers takes into account the effect of the noise around the high-integrity solution (first elementary hybrid solution) which is used as reference for the calculation of the protection radius. Indeed, although it is unaffected by a failure of the receiver, the latter is not necessarily rigorously exact since it is subject to the effect of the normal errors affecting the GNSS measurements or the inertial sensors.

The calculations of the first threshold SEΔG1 and of the first protection radius for the hybrid system RHG1 only depend on the first extended variance/covariance matrix. The calculations are advantageously performed in a predictive manner on a predetermined flight path in order to predict the performance of the aircraft over this flight path. The prediction calculation is carried out based on a predetermined flight path, on statistical characteristics of the inertia (which allow the variance/covariance matrix of the Kalman filters to be propagated and re-adjusted along the flight path), on the guaranteed performance for the constellation (the worst case scenario for GPS measurement precision per satellite axis is taken into account) and on the minimum signal-to-noise ratio needed to accept the measurements. This minimum signal-to-noise ratio allows the normal or noise error part to be calculated that is added by the receiver in the calculation of the pseudo-measurements.

This analysis is carried out on the basis of a module for delivering inertial measurements and of primary and secondary modules for delivering raw measurements which respectively correspond to modelling units for inertial measurements, for primary raw measurements and for secondary raw measurements. The precisions of the raw measurements $MB_{j1}$ and $MB_{j2}$ and of the inertial measurements are then values predetermined as a function of the flight path to be followed (for the positioning variables) and as a function of the error statistics for the satellite positioning receivers and for the sensors of the inertial measurement unit (performance characteristics guaranteed by the DoD (Department of Defence) in the GPS Standard document: "Positioning Service Performance Standard"). In this embodiment, the propagation and re-adjustment operations of the extended variance/covariance matrix are carried out along the flight path, but the vectors of state (hybrid and extended) are not propagated and re-adjusted since inertial and satellite measurements models are available but not real measurements. Hence, neither the hybrid corrections HYC nor the estimations of the vectors of state VE and EVEE1 are calculated. This is a conventional method of simulating the behaviour of a Kalman filter across its variance-covariance matrix alone.

The prediction analysis for the guaranteed protection radius allows it to be predicted whether the aircraft has the necessary performance capabilities for following a predetermined mission. For example, in order to follow an RNP 0, 1 procedure, the aircraft must be capable of determining its position with a protection radius less than or equal to a limit value L equal to 0.175 Nm, a nautical mile (Nm) being equal to 1852 m. When the first protection radius RHG1 is greater than the limit L or too close to this limit value, it is considered that the aircraft does not have the performance capabilities to follow this procedure.

As a variant, the calculation of protection radii is advantageously carried out in real time, during a mission followed by the aircraft. In this variant, the module for delivering inertial measurements and the primary and secondary modules for delivering raw measurements are respectively, as shown in FIG. 1, an inertial navigation system CI, 20 and primary and secondary satellite positioning receivers. The analysis in real time thus allows the real performance to be taken into account from the observed measurements (performance characteristics of the satellite and inertial receivers) which are often better than the performance capabilities guaranteed by the DoD in the GPS Standard document.

In this embodiment, the estimation EVEE1 of the first extended vector of state VEE1 is carried out on the basis of a re-adjustment of the Kalman filters K1, KE1 using the real inertial and raw measurements. The difference part $\Delta X$ of the extended vector of state VEE1 is representative of the operational state of the two satellite positioning receivers GNSS1, GNSS2. The comparison of the components of the estimation of this difference with associated thresholds (determined as previously explained) amounts to an analysis of the coherence between the first and the second elementary hybrid solution. It allows an undetected failure of one of these receivers to be detected. The processor CALC, 100, performs the first detection test described previously at regular intervals of time. For example, a first threshold SEAH1 relating to the horizontal component of the position is compared with the components of the estimation EVEE1 of the extended vector of state VEE1 corresponding to the differences relating to the lateral and longitudinal components of the position. As a variant, or in addition, the components of the estimation EVEE1 of the first extended vector of state VEE1 corresponding to the differences relating to the components of any other position measurement (for example, altitude) is compared to a corresponding threshold. During the mission, at regular intervals of time the protection radius is advantageously compared to the limit value L. An alarm relating to the performance characteristics of the aircraft is raised when the protection radius exceeds this limit because the aircraft no longer possesses the performance capabilities needed in order to follow the mission.

When the extended processor CALC, 100, detects a failure, the available redundancy must be analysed in order to see whether the faulty receiver can be excluded or whether another strategy needs to be adopted. When the hybrid system according to the invention only comprises 2 satellite positioning receivers, namely the primary receiver GNSS1 and the secondary receiver GNSS2, that supply the first extended filter KE1, it is not possible to identify the one exhibiting a hardware failure. So, the supply to the Kalman hybridization filter K1 and to the extended Kalman filter KE1 by means of the raw measurements is then halted. The raw measurements are said to be no longer available for the Kalman filters. This amounts to ceasing the hybridization of the inertial measurements and the first raw measurements and to ceasing the re-adjustment of the extended Kalman filter KE1 by means of the raw measurements. The Kalman filters are still re-adjusted by means of the inertial measurements (for the hybridization filter) and of the first elementary hybrid solution PPVI1 (for the extended Kalman filter); they continue to produce retroactive estimates of the vectors of state VE, VEE1. These filters are said to propagate the inertial errors.

Advantageously, the protection radius RHG1 protecting the first elementary hybrid solution against the eventuality of failures of the satellite positioning receivers is calculated for a non-integrity level PNI equal to a normal non-integrity level PNIN as long as no failure of a GNSS receiver is detected. When a failure is detected and 'coasting' mode is engaged, the protection radius is calculated for a coasting non-integrity level PNIS equal to the normal non-integrity level PNIN or a non-integrity level of higher value. The coasting non-integrity level is, for example, equal to the normal non-integrity level PNIN if it is desired for the aircraft to continue on its flight path while guaranteeing the same performance level. It is higher than the normal non-integrity level PNIN when, following a failure detection, the aircraft follows a new flight path over which it is not constrained to guarantee the position measurements with a non-integrity level as low as in approach phase (for example, it leaves an approach flight path and climbs in altitude following an escape flight path).

In coasting mode, the threshold SEAG1 starting from which the protection radius is calculated is still calculated using the first extended variance/covariance matrix, but the value of this matrix has changed since the detection of the failure by propagation of the inertial errors. The protection radius in coasting mode thus takes into account the effect of the failure on the hybrid solution even when the raw measurements have ceased to be used. It limits the position error in coasting mode with the desired degree of confidence. This radius is perfectly usable for defining an escape flight path which would not be the case if the contribution of the noise were not taken into account. This precaution is necessary due to the recursive nature with a long time constant of the Kalman hybridization filter (a satellite measurement that has disappeared continues to influence the hybrid solution and its protection radius for a long time). The protection radius of the hybrid system according to the invention is also available at any time even when a failure is detected.

In prediction mode, it is possible to evaluate the value of the hybrid protection radius of the elementary hybrid solution in coasting mode by making the assumption of a failure detection at a given moment in time and by calculating the protection radius for a coasting non-integrity level PNIS.

Figure 2:
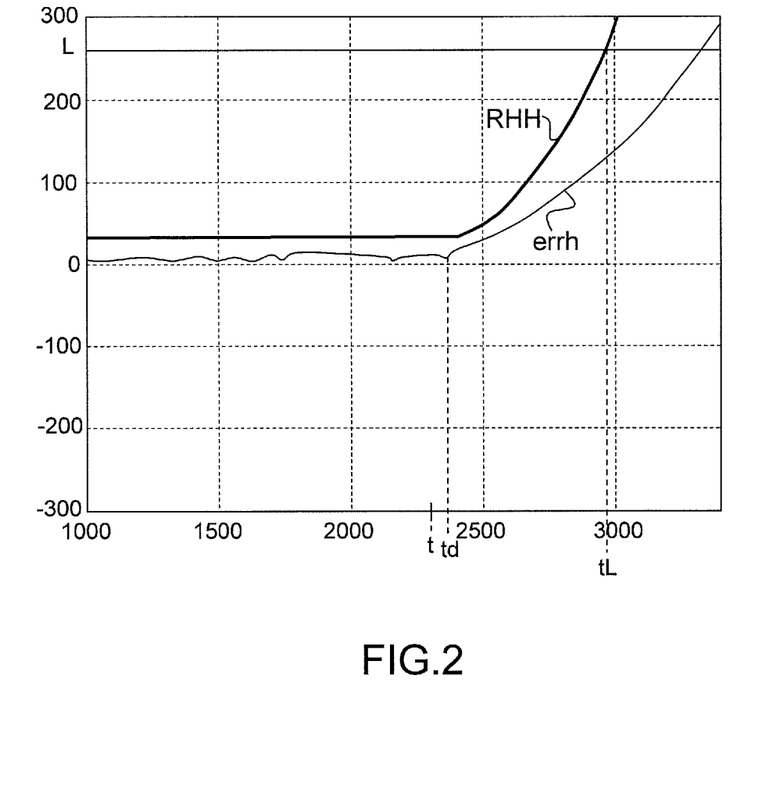
FIG. 2 shows an example of the behaviour, as a function of time, of a protection radius associated with the horizontal component of the position of the aircraft together with the error on the said horizontal component in the first elementary hybrid solution.

FIG. 2 illustrates an example of behaviour of the first protection radius of the hybrid system RHH (thick line) associated with a horizontal position (G=H) and of the error errh on the horizontal position as a function of time when a failure of a satellite receiver is injected at the time t equal to 2350 seconds. Prior to the failure, the hybrid protection radius is calculated for a normal level of integrity of $10^{-7}$/h. The error is detected at the detection time td equal to 2400 seconds. The hybrid system then switches to coasting mode, and the coasting level of integrity is $10^{-3}$/h. It is observed that the first protection radius increases while at the same time increasing, as desired, the elementary hybrid horizontal position error. Indeed, the satellite measurements are no longer used to re-adjust the elementary hybrid solution which degrades the precision of the inertial solution. No risks are taken in evaluating the performance of the aircraft on the basis of the hybrid protection radius. In addition, the fact that a continuous calculation of the protection radius is available can avoid an aircraft having to escape from the flight path that it is following as soon as the failure is detected (when the error on the position is small). The first protection radius models the effect of the failure on the position error. The aircraft can wait until the protection radius exceeds the limit L. The first protection radius calculated for a coasting level of integrity remains equal to the protection radius calculated for a normal non-integrity level PNIN equal to $10^{-7}$/h as long as the protection radius calculated for a coasting non-integrity level PNIS equal to 10–3 has not met it. In other words, the protection radius here is calculated using the non-integrity level that generates the largest protection radius between PNIN and PNIS. When the coasting non-integrity level is greater than the normal non-integrity level, this avoids the protection radius decreasing after the detection of a failure.

Figure 3:
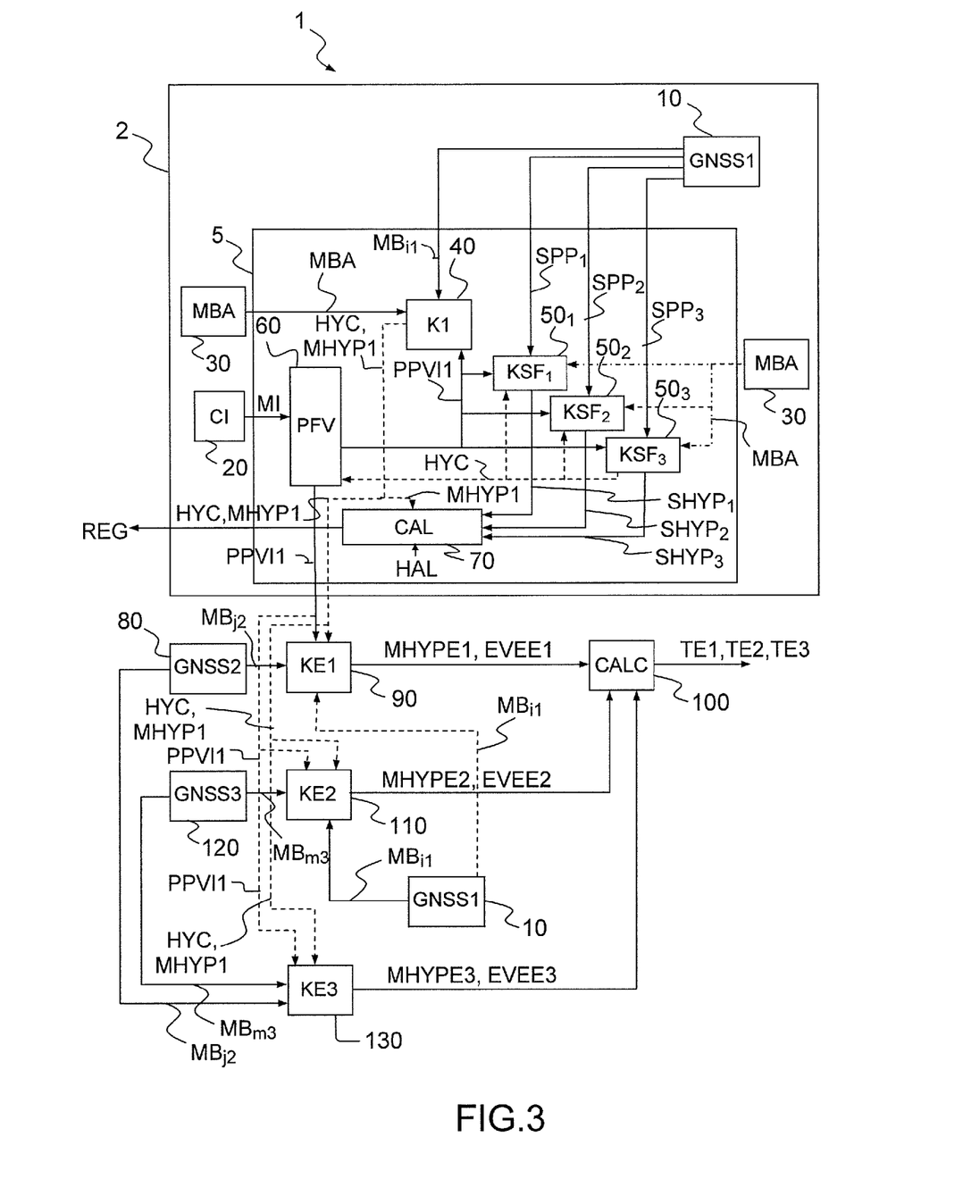
FIG. 3 shows a second example of the hybrid system according to the invention.

In a second embodiment, shown in FIG. 3, the hybrid system according to the invention comprises a tertiary satellite positioning receiver GNSS3, 120, producing tertiary raw measurements $MB_{m3}$, coming from R visible satellites, with m in the range between 1 and R (integer number). Advantageously, such a hybrid system comprises a second KE2, 110, and a third KE3, 130, extended Kalman filter. The second extended filter KE2, 110, receives the same data as the first extended filter KE1 with the exception of the secondary raw measurements $MB_{j2}$ which are replaced by the tertiary raw measurements $MB_{m3}$. It has a second vector of state VEE2 similar to VEE1 with the exception of the HI2 part which is replaced by the errors affecting the clock parameters HI3 of the tertiary receiver GNSS3 and with the exception of the ΔX part which is representative of the difference between the first elementary hybrid solution PPVI1 and a third elementary hybrid solution PPVI3 obtained by hybridizing, by means of the first hybridization unit 5, the inertial measurements MI and the tertiary measurements $MB_{m3}$ coming from satellites common to the primary and tertiary receivers. It produces a second estimation EVEE2 of the second extended vector of state VEE2; the second extended vector of state is estimated by the filter KE2 by successively using the primary and tertiary raw measurements which originate from the same satellites. It also produces a second extended variance/covariance matrix MHYPE2, representing the error statistics for the estimation of the extended vector of state VEE2.

The third extended filter KE3, 130, receives the same data as the first extended filter KE1 with the exception of the primary raw measurements $MB_{i1}$ which are replaced by the tertiary measurements $MB_{m3}$. It has a third vector of state VEE3 similar to VEE1 with the exception of the HI1 part which is replaced by the errors on the clock parameters HI3 of the tertiary receiver and with the exception of the ΔX part which is representative of the difference between the second elementary hybrid solution PPVI2 and the third elementary hybrid solution PPVI3. It produces a third estimation EVEE3 of the third extended vector of state VEE3; the third extended vector of state is estimated by the filter KE3 by successively using the secondary and tertiary raw measurements which originate from the same satellites. It also produces a third extended variance/covariance matrix MHYPE3, representing the error statistics for the estimation of the extended vector of state VEE3.

In this embodiment, the processor CALC, 100 also calculates a second and a third protection radius for the hybrid system RHG2, RHG3 relating to a position quantity G, using the second MHYPE2 and, respectively, the third MHYPE3 extended variance/covariance matrices. The calculations are carried out in the same manner as for the first threshold SEΔG1 based on a second SEΔG2 and on a third threshold SEΔG3. The extended processor CALC, 100, also performs a second and a third test similar to the first test, consisting in comparing the components of the second EVEE2 and the third EVEE3 estimations relating to the difference obtained for the quantity G with the second SEΔG2 and the third SEΔG3 thresholds, respectively. The results TE1, TE2, TE3 of the first, second and third tests are positive when the components of the first EVEE1, respectively the second EVEE2, respectively the third EVEE3 relating to the difference obtained for the quantity G are respectively greater than the first SEΔG1, second SEΔG2 and third SEΔG3 thresholds. When at least one of the results TE1, TE2, TE3, respectively of the first, second and third tests is positive, the alarm is raised and a defective receiver is detected. The extended processor CALC, 100, also identifies the defective receiver, from amongst the three receivers, based on the test results and, where relevant, excludes the defective receiver.

When two results are positive and one result is negative, the defective receiver is the receiver that is not taken into account in order to perform the test whose result is negative. For example, in the case of a failure on the secondary receiver GNSS2, only the first and the third test are positive.

Figure 4:
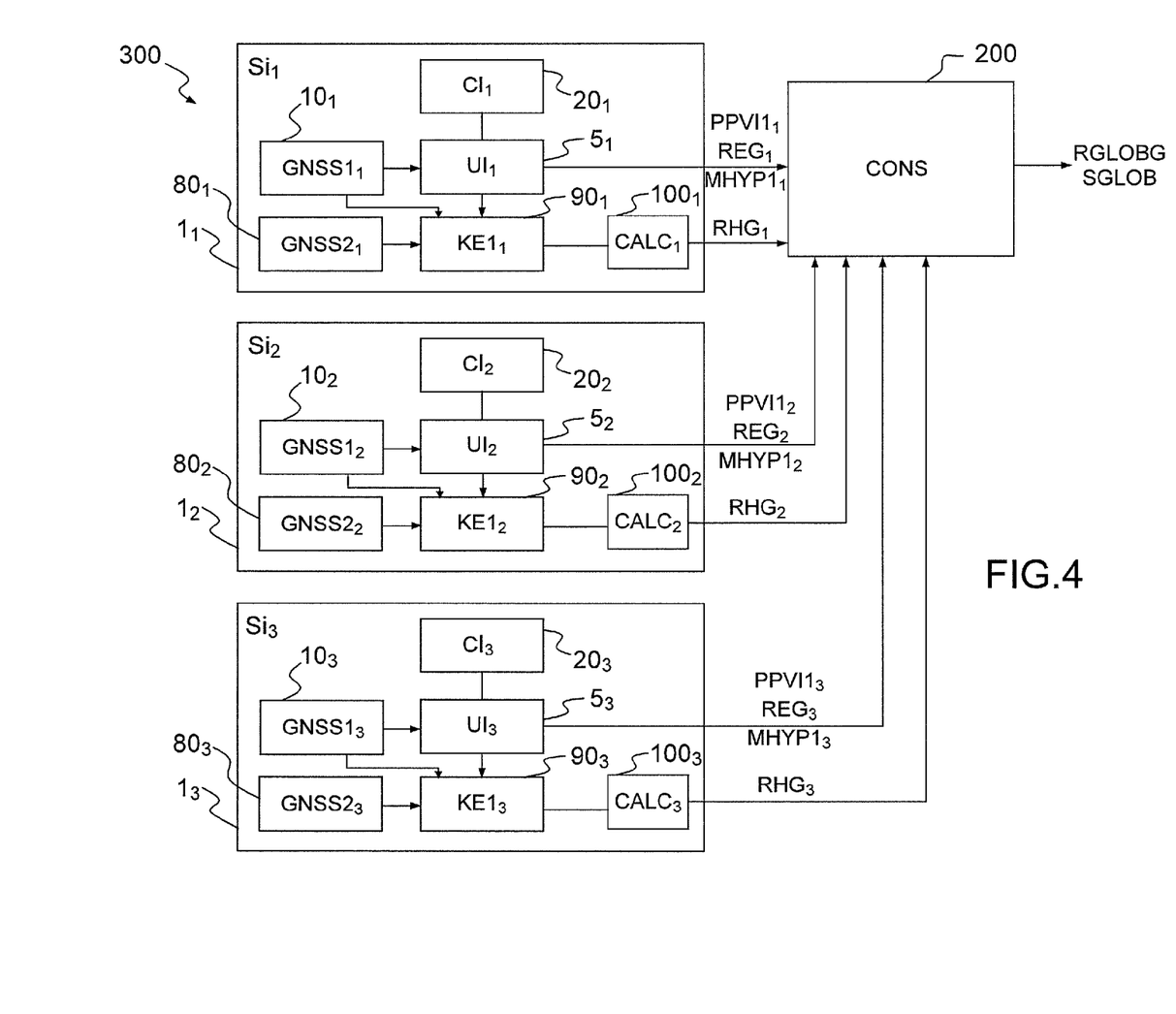
FIG. 4 shows an example of the device according to the invention.

Another subject of the invention is a device 300 comprising a number M of hybrid systems $Si_k$, $1_k$ according to the invention where k is an index in the range between 1 and M, as shown in FIG. 4 where M is equal to 3. The hybrid device comprises an assembly of satellite positioning receivers comprising a first receiver GNSSA and a second receiver GNSSB. The hybrid systems $Si_k$, $1_k$, comprise different inertial navigation systems $CI_k$, $20_k$. Each hybrid system $Si_k$ comprises a primary receiver $GNSS1_k$, $10_k$, and a secondary receiver $GNSS2_k$, $80_k$, which could be either of the first GNSSA or the second receiver GNSSB, the primary receiver of a hybrid system being different from the secondary receiver of the same hybrid system (if the primary receiver is GNSSA, then the secondary receiver is the second receiver GNSSB). To improve clarity, the data exchanged between the elements composing each hybrid system are not shown. Each hybrid system comprises a hybridization unit $UI_k$, $5_k$, a processor $CALC_k$, $100_k$ and an extended Kalman filter $KE1_k$, $90_k$. Each hybrid system $Si_k$ delivers, to a consolidation module CONS, 200, a first elementary hybrid solution $PPVI1_k$, a protection radius $REG_k$ protecting an elementary hybrid measurement of the position G against satellite failures, a first protection radius $RHG1_k$ protecting the position quantity G against hardware failures of one of the satellite positioning receivers of the hybrid system together with a primary variance/covariance matrix $MHYP1_k$ associated with the error estimated on the first elementary hybrid solution $PPVI1_k$.

The consolidation module CONS, 200, determines a global hybrid solution SGLOB and an associated global protection radius RGLOBG, for a position quantity G, for the device according to the invention. The global protection radius protects the global solution from the eventuality of failures of the satellites, of hardware failures in the satellite positioning receivers and also from the eventuality of hardware failures in the inertial navigation systems (or, more generally, in the ADIRU). In order to protect the global hybrid solution against possible hardware failures in the various inertial navigation systems, the consolidation module CONS, 200, verifies the coherence between a global hybrid solution SGLOB and the individual hybrid solutions $PPVI1_k$. The reasoning is based on the fact that the probability of two inertial navigation systems simultaneously having undetected hardware failures by their respective integrated tests is negligible compared to the non-integrity level sought. In other words, it checks whether the difference between the three first elementary hybrid solutions $PPVI1_k$, and the global solution SGLOB is statistically probable. The global hybrid solution SGLOB is for example the barycentre of two or three individual hybrid solutions taken from amongst the first elementary hybrid solutions $PPVI1_k$ of the three hybrid systems $Si_k$. As a variant, the global solution SGLOB is equal to one of the first elementary hybrid solutions $PPVI1_k$ of one of the three hybrid systems $Si_k$. In order to facilitate the understanding of the following paragraphs, this scenario will be adopted without loss of generality. The role of the consolidation carried out by the consolidation module CONS, 200, is to protect the global hybrid solution from the hardware failures relating to the inertial measurements units $CI_k$.

In order to determine the global protection radius RGLOBG, the consolidation module, 200, calculates an inertial protection radius RIMUG relating to a position measurement G (which is for example the horizontal position H). The inertial protection radius RIMUG protects the global hybrid solution against a possible failure of one of the inertial navigation systems $CI_k$ (or ADIRU comprising the said inertial measurement unit).

The inertial protection radius RIMUG is calculated starting from individual inertial protection radii $RIMUG_k$ calculated for each inertial navigation system $CI_k$ whose first elementary hybrid solution $PPVI1_k$ is different from the global solution SGLOB. In other words, the inertial protection radius RIMUG is calculated starting from individual inertial protection radii $RIMUG_k$ calculated for the inertial navigation systems that are different from the inertial navigation system from which the global solution could potentially come, when the global solution is equal to an elementary solution. Each individual inertial protection radius $RIMUG_k$ depends on:

the statistics $SG_k$ of the difference between the global solution and the first elementary solution $PPVI1_k$, for the quantity G (for example the horizontal position), the variance/covariance matrix of the elementary solution $MHYP1_k$, a second acceptable false alarm frequency PFA2 representing the maximum probability of false alarms during a test for detecting hardware failures affecting one of the inertial measurement units of the device according to the invention and on a second level of risk PND2 chosen so as to be less than or equal to the ratio between the non-integrity level PNI and a determined probability PP2 of occurrence of a failure of an inertial navigation system.

A second threshold $SE\Delta G2_k$ is fixed, starting from which the difference between an elementary solution and the global solution is judged to be statistically improbable. The second threshold $SE\Delta G2_k$ is calculated in the same manner as the first threshold $SE\Delta G1$ but using the second false alarm frequency PFA2 and the statistics $SG_k$ of the difference between the global solution and the first elementary solution $PPVI1k$, associated with the quantity G.

Advantageously, the position quantity G is the horizontal position (which involves two components, lateral and longitudinal). Under normal conditions of use (in the presence of GPS and after convergence of the hybridization filter), the three hybrid systems are strongly correlated because the residual errors of the elementary hybrid solutions are the long-term errors of the raw measurements coming from the satellite positioning receivers. As the 2 satellite positioning receivers GNSSA and GNSSB use the same satellites, the residual errors on the components of the individual first hybrid solutions are globally the same for each component. In coasting mode on the other hand, the errors tend to be decorrelated, notably during aircraft manoeuvres, due to the heading error which is not common to the three elementary hybrid systems. In view of this analysis, a conservative assumption can in any case be made by saying that in every case the errors are decorrelated. The statistics of the difference can therefore be equal to the sum of the errors of the variance-covariance matrices of each of the first elementary hybrid solutions. The second threshold is therefore the same for each elementary system.

The individual inertial protection radius $RIMUG_k$ is the sum of the second threshold and of a term $RBIMUG_k$ relating to the noise affecting the said first elementary hybrid solution $PPVI1_k$ in the absence of failure of an inertial navigation system. The term relating to the noise $RBIMUG_k$ is calculated in the same manner as the protection radius associated with the noise but using the level of risk PND2 and the variance/covariance matrix of the elementary solution $MHYP1_k$. The inertial protection radius RIMUG is equal to the smallest individual inertial protection radius $RIMUG_k$. The global protection radius RGLOBG associated with a position quantity G is equal to the maximum protection radius from amongst the protection radii $REG_k$ associated with a position quantity G, the protection radii $RHG_k$ and the inertial protection radius RIMUG.

What is claimed is:

1. A hybrid system RHG1 comprising at least an elementary hybrid system, which comprises:

a primary satellite positioning receiver delivering primary elementary raw measurements $MB_{i1}$ using signals received by a primary satellite positioning receiver from first tracked visible satellites, the primary elementary raw measurements $MB_{i1}$ comprising primary positioning measurements for each of the first tracked visible satellites, wherein the primary positioning measurements for a given tracked visible satellite comprise pseudo-range and delta-range measurements of the tracked visible satellite, an elementary inertial navigation system delivering inertial measurements MI comprising position and speed points, a hybridization unit receiving the inertial measurements MI and, when the primary elementary raw measurements $MB_{i1}$ are available, also receiving the primary elementary raw measurements $MB_{i1}$, and producing (1) a first elementary hybrid solution PPVI1 comprising first elementary hybrid position measurements obtained by hybridizing the inertial measurements MI and the primary elementary raw measurements $MB_{i1}$, when available, and (2) a primary variance/covariance matrix MHYP1 for the error made in the estimation of a vector of state VE, wherein the vector of state VE corresponds to the errors in the elementary hybrid system obtained by determining the difference between the first elementary hybrid position measurements in the first elementary hybrid solution PPVI1 and the primary elementary raw measurements $MB_{i1}$, and wherein the primary variance/covariance matrix MHYP1 is calculated by a Kalman hybridization filter K1, characterized in that the said hybrid system RHG1 also comprises:

a secondary satellite positioning receiver delivering secondary elementary raw measurements $MB_{j2}$ using signals received by a secondary satellite positioning receiver from second tracked visible satellites, the secondary elementary raw measurements $MB_{j1}$ comprising secondary positioning measurements for each of the second tracked visible satellites, wherein the secondary positioning measurements for a given second tracked visible satellite comprise pseudo-range and delta-range measurements of the tracked visible satellite, a first extended Kalman filter KE1 receiving the first elementary hybrid solution PPVI1, the primary variance/covariance matrix MHYP1 and, when the primary and secondary elementary raw measurements $MB_{i1}$ and $MB_{j2}$ are available, the primary and secondary elementary raw measurements $MB_{i1}$ and $MB_{j2}$ coming from satellites common to the first and second tracked visible satellites, the said extended filter KE1 having a first extended vector of state VEE1 comprising a part known as hybrid difference $\Delta X$, representing the difference between the first elementary hybrid solution PPVI1 and a second elementary hybrid solution PPVI2, comprising second elementary hybrid position measurements obtained by hybridizing the inertial measurements MI and the secondary elementary raw measurements $MB_{j2}$ coming from satellites common to the first and second tracked visible satellites, when available, the said first extended vector of state VEE1 also comprising an error part of the elementary hybrid system X1 representing the errors in the various components of the first elementary hybrid solution PPVI1 and being estimated by means of an error model representing the errors of an inertial navigation system, the said first extended Kalman filter KE1 delivering a first extended variance/covariance matrix MHYPE1 for the error of a first estimation EVEE1 of the first extended vector of state VEE1, and an extended processing module CALC receiving the first extended variance/covariance matrix MHYPE1, the said extended processing module CALC determining a first elementary protection radius for the hybrid system RHG1, associated with a one of said first elementary hybrid position measurements, using the first extended variance/covariance matrix MHYPE1 as a function of a first predetermined false alarm probability PFA1 representing a maximum probability of an alarm being triggered when no satellite positioning receiver has a fault, of a predetermined non-integrity level PNI representing a maximum probability of an error in one of said first elementary hybrid position measurements exceeding the protection radius without an alarm being triggered, and of a first predetermined probability PP1 corresponding to the probability of occurrence of an undetected hardware failure of a satellite positioning receiver.

2. The hybrid system RHG1 according to claim 1, characterized in that the first elementary protection radius of the hybrid system RHG1 associated with one of said first elementary hybrid position measurements is calculated based on a first detection threshold SEΔG1 associated with said hybrid difference ΔX relating to the one of said first elementary hybrid position measurements corresponding to a value of the hybrid difference ΔX beyond which a failure of one of said primary or secondary satellite receiver is supposed to have occurred, the said first detection threshold SEΔG1 being obtained based on a part of the first extended variance/covariance matrix MHYPE1 associated with the hybrid difference ΔX relating to the one of said first elementary hybrid position measurements, for the first predetermined false alarm probability PFA1, the said first elementary protection radius of the hybrid system RHG1 also depending on a part of the first extended variance/covariance matrix MHYPE1 associated with the error part of the elementary hybrid system X1 relating to the one of said first elementary hybrid position measurements for a first level of risk PND1 chosen so as to be less than or equal to the ratio between the non-integrity level PNI and the probability PP1 of occurrence of an undetected hardware failure of a satellite positioning receiver.

3. The hybrid system RHG1 according to claim 1 or 2, characterized in that:
the primary satellite positioning receiver and the secondary satellite positioning receiver, respectively, are units for modeling primary raw and secondary raw measurements, respectively, delivered by a primary and secondary satellite positioning receiver, respectively, operating using tracked visible satellites,
the elementary inertial navigation system for delivering inertial measurements MI is a unit for modeling inertial measurements delivered by an inertial navigation system.

4. An extended hybrid system comprising the hybrid system RHG1 according to claim 1, characterized in that:
the primary satellite positioning receiver and the secondary satellite positioning receiver respectively correspond to a primary GNSS1, and a secondary GNSS2 satellite positioning receivers operating using tracked visible satellites, the elementary inertial navigation system for delivering inertial measurements MI is an inertial navigation system CI.

5. The hybrid system RHG1 according to claim 4, characterized in that the first extended Kalman filter KE1 also receives a hybrid correction HYC, comprising a vector of state VE corresponding to the errors on the elementary hybrid system obtained by observing the difference between the elementary hybrid position measurements comprised in the first elementary hybrid solution PPVI1 and the primary raw measurements, and produces a first estimation EVEE1 of the first extended vector of state VEE1, the said extended processing module CALC performing a first test for detection of a hardware failure, affecting one of the satellite positioning receivers taken from either the primary receiver or the secondary receiver, by comparing the components of the first estimation EVEE1, relating to the hybrid difference ΔX obtained for one of said first elementary hybrid position measurements, with a first detection threshold SEΔG1 associated with the hybrid difference ΔX relating to the one of said first elementary hybrid position measurements, in that when at least one of the components of the first estimation EVEE1, of the first extended vector of state VEE1 relating to the difference ΔX obtained for one of said first elementary hybrid position measurements, is greater than the first detection threshold SEΔG1, the extended processing module CALC triggers an alarm on the presence of a failure of at least one satellite positioning receiver.

6. The hybrid system RHG1 according to claim 5, characterized in that when none of the components of the first estimation EVEE1 of the first extended vector of state VEE1 relating to the difference ΔX obtained for the one of said first elementary hybrid position measurements is greater than the first detection threshold SEΔG1, the non-integrity level PNI is equal to a predefined normal non-integrity level PNIN.

7. The hybrid system RHG1 according to claim 5, characterized in that when an alarm is triggered, a supply for the hybridization unit and for the extended Kalman filter KE1 by means of the primary and secondary raw measurements is stopped and in that the said non-integrity level PNI is equal to a coasting non-integrity level PNIS which is a non-integrity level greater than or equal to a predefined normal non-integrity level PNIN.

8. A hybrid system comprising the hybrid system RHG1 according to claim 4 and a hybrid system RHG2, RHG3, which comprises:
a tertiary satellite positioning receiver GNSS3 producing tertiary raw measurements $MB_{m3}$, using signals received by the tertiary satellite positioning receiver from third tracked visible satellites, the tertiary raw measurements $MB_{m3}$ comprising tertiary positioning measurements for each of the third tracked visible satellites, wherein the tertiary positioning measurements for a given third tracked visible satellite comprise pseudo-range and delta-range measurements of the tracked visible satellite,
a second KE2 extended Kalman filter receiving the same data as the first extended filter KE1 with the exception of the secondary raw measurements $MB_{j2}$ which are replaced by the tertiary raw measurements $MB_{m3}$ coming from satellites common to the first and third tracked visible satellites, and producing a second estimation EVEE2 of a second extended vector of state VEE2, and an associated second extended variance/covariance matrix MHYPE2,
a third KE3 extended filter receiving the same data as the first extended filter KE1 with the exception of the primary raw measurements $MB_{i1}$ which are replaced by the tertiary measurements $MB_{m3}$ and producing a third estimation EVEE3 of a third extended vector of state VEE3, and an associated third extended variance/covariance matrix MHYPE3, the said extended processor CALC also calculating a second and a third protection radius for the hybrid system RHG2, RHG3 relating to a set of elementary hybrid position measurements, using the second MHYPE2 and respectively the third MHYPE3 extended variance/covariance matrices and also performing a second and a third test including comparing the components of the second EVEE2 and the third EVEE3 estimation, relating to the difference obtained for the set of elementary hybrid position measurements, with respectively a second SEΔG2 and a third SEΔG3 thresholds, results TE1, TE2, TE3 of the first, second and third tests being positive when the said components of the first EVEE1, respectively the second EVEE2, respectively the third EVEE3 estimations are respectively greater than the first SEΔG1, second SEΔG2 and third SEΔG3 thresholds, and in that when at least one of the results TE1, TE2, TE3, respectively from the first, second and third tests is positive, an alarm is raised signifying a defective receiver, the said extended processor CALC also identifying the defective receiver, from amongst the three receivers, based on the results TE1, TE2, TE3 and, where necessary, excluding the defective receiver.

9. An extended hybrid system comprising the hybrid system RHG1 according to claim 2, characterized in that:
the primary satellite positioning receiver, and the secondary satellite positioning receiver respectively correspond to a primary GNSS1, and a secondary GNSS2 satellite positioning receivers operating using visible satellites,
the elementary inertial navigation system for delivering inertial measurements MI is an inertial navigation system CI.

10. The hybrid system RHG1 according to claim 9, characterized in that the first extended Kalman filter KE1 also receives a hybrid correction HYC and produces a first estimation EVEE1 of the first extended vector of state VEE1, the said extended processing module CALC performing a first test for detection of a hardware failure, affecting one of the satellite positioning receivers taken from either the primary receiver or the secondary receiver, by comparing the components of the first estimation EVEE1, relating to the hybrid difference ΔX obtained for one of said first elementary hybrid position measurements, with a first detection threshold SEΔG1 associated with the hybrid difference ΔX relating to the one of said first elementary hybrid position measurements, in that when at least one of the components of the first estimation EVEE1, of the first extended vector of state VEE1 relating to the difference ΔX obtained for one of said first elementary hybrid position measurements, is greater than the first detection threshold SEΔG1, the extended processing module CALC triggers an alarm on the presence of a failure of at least one satellite positioning receiver.

11. The hybrid system RHG1 according to claim 10, characterized in that when none of the components of the first estimation EVEE1 of the first extended vector of state VEE1 relating to the difference ΔX obtained for the one of said first elementary hybrid position measurements is greater than the first detection threshold SEΔG1, the non-integrity level PNI is equal to a normal non-integrity level PNIN.

12. The hybrid system RHG1 according to claim 10, characterized in that when an alarm is triggered, a supply for the hybridization unit and for the extended Kalman filter KE1 by means of the primary and secondary raw measurements is stopped and in that the said non-integrity level PNI is equal to a coasting non-integrity level PNIS greater than or equal to the normal non-integrity level PNIN.

13. A hybrid system comprising the hybrid system RHG1 according to claim 9 and a hybrid system RHG2, RHG3, which comprises:
a tertiary satellite positioning receiver GNSS3 producing tertiary raw measurements $MB_{m3}$ using signals received by the tertiary satellite positioning receiver from third tracked visible satellites, the tertiary raw measurements $MB_{m3}$ comprising tertiary positioning measurements for each of the third tracked visible satellites, wherein the tertiary positioning measurements for a given third tracked visible satellite comprise pseudo-range and delta-range measurements of the tracked visible satellite,
a second KE2 extended Kalman filter receiving the same data as the first extended filter KE1 with the exception of the secondary raw measurements $MB_{j2}$ which are replaced by the tertiary raw measurements $MB_{m3}$ coming from satellites common to the first and third tracked visible satellites, and producing a second estimation EVEE2 of a second extended vector of state VEE2, and an associated second extended variance/covariance matrix MHYPE2,
a third KE3 extended filter receiving the same data as the first extended filter KE1 with the exception of the primary raw measurements $MB_{i1}$ which are replaced by the tertiary measurements $MB_{m3}$ and producing a third estimation EVEE3 of a third extended vector of state VEE3, and an associated third extended variance/covariance matrix MHYPE3, the said extended processor CALC also calculating a second and a third protection radius for the hybrid system RHG2, RHG3 relating to a set of elementary hybrid position measurements, using the second MHYPE2 and respectively the third MHYPE3 extended variance/covariance matrices and also performing a second and a third test including comparing the components of the second EVEE2 and the third EVEE3 estimation, relating to the difference obtained for the set of elementary hybrid position measurements, with respectively a second SEΔG2 and a third SEΔG3 thresholds, results TE1, TE2, TE3 of the first, second and third tests being positive when the said components of the first EVEE1, respectively the second EVEE2, respectively the third EVEE3 estimations are respectively greater than the first SEΔG1, second SEΔG2 and third SEΔG3 thresholds, and in that when at least one of the results TE1, TE2, TE3, respectively from the first, second and third tests is positive, an alarm is raised signifying a defective receiver, the said extended processor CALC also identifying the defective receiver, from amongst the three receivers, based on the results TE1, TE2, TE3 and, where necessary, excluding the defective receiver.

14. The hybrid system as in any of claim 4-8 or 9-13, characterized in that the satellite positioning receivers are included in one or more radiofrequency multi-channel receivers MMR.

15. The hybrid system as in any of claim 4-8 or 9-13, characterized in that the inertial navigation system is a reference inertial and aerodynamic navigation system.

16. The hybrid system according to claim 15 characterized in that the satellite positioning receivers are included in one or more radiofrequency multi-channel receivers MMR.

17. A device comprising a number M greater than 1 of elementary hybrid systems $Si_k(1_k)$ according to claim 1, 2, 8 or 13, each supplying an elementary protection radius $REG_k$ associated with a set of elementary hybrid position measurements, a hybrid protection radius $RHG_k$ associated with the said set of elementary hybrid position measurements together with a variance/covariance matrix of an elementary solution $MHYP1_k$ associated with the error made on a first elementary hybrid solution $PPVI1_k$, the said device also comprising a consolidation module CONS determining a global hybrid solution SGLOB, the said consolidation module CONS determining an inertial protection radius RIMUG, which is the lowest value taken from amongst the individual inertial protection radii $RIMUG_k$ calculated for each inertial navigation system $CI_k$, the first elementary hybrid solution $PPVI1_k$ which is different from the global solution SGLOB, each individual inertial protection radius $RIMUG_k$ depending on:

statistics $SG_k$ for the difference between the global solution and the first elementary solution $PPVI1_k$, for the quantity, the first variance/covariance matrix for the elementary solution $MHYP1_k$, a second acceptable false alarm frequency PFA2 and on a second level of risk PND2 chosen so as to be less than or equal to the ratio between the non-integrity level PNI and a determined probability PP2 of occurrence of a failure in an inertial navigation system.

18. The device according to claim 17, characterized in that the statistics $SG_k$ for the difference between the global solution and the first elementary solution $PPVI1_k$, for the set of elementary hybrid position measurements, is equal to the sum of the errors in the variance-covariance matrices of each of the first elementary hybrid solutions.

19. The device according to claim 17, characterized in that the consolidation module CONS also determines a global protection radius RGLOBG associated with a set of the elementary hybrid position measurements composing the global hybrid solution SGLOB, the said protection radius RGLOBG being the highest value taken from amongst:
the elementary protection radii $REG_k$,
the hybrid protection radii $RHG_k$ or
the inertial protection radius RIMUG.

* * * * *